(12) United States Patent
Rao et al.

(10) Patent No.: US 10,891,686 B1
(45) Date of Patent: Jan. 12, 2021

(54) SYSTEM AND METHOD FOR USAGE BASED INSURANCE FOR ON-DEMAND RENTAL DEVICE

(71) Applicant: Wells Fargo Bank, N.A., San Francisco, CA (US)

(72) Inventors: Abhijit Rao, Irvine, CA (US); Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 620 days.

(21) Appl. No.: 15/387,989

(22) Filed: Dec. 22, 2016

(51) Int. Cl.
| | |
|---|---|
| *G06Q 30/06* | (2012.01) |
| *G06Q 40/08* | (2012.01) |
| *G06Q 30/02* | (2012.01) |
| *H04L 29/06* | (2006.01) |

(52) U.S. Cl.
CPC ..... *G06Q 30/0645* (2013.01); *G06Q 30/0207* (2013.01); *G06Q 40/08* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 8,606,512 B1* | 12/2013 | Bogovich | .............. | G06Q 40/08 701/423 |
| 2013/0046559 A1* | 2/2013 | Coleman | ................ | G06Q 10/10 705/4 |
| 2013/0304514 A1* | 11/2013 | Hyde | .................... | G06Q 40/08 705/4 |
| 2014/0278837 A1* | 9/2014 | Blumer | .................. | G07B 15/00 705/13 |
| 2016/0189304 A1* | 6/2016 | Todasco | ................ | G06Q 40/08 705/4 |

* cited by examiner

*Primary Examiner* — Joseph W. King
(74) *Attorney, Agent, or Firm* — Walter | Haverfield LLP; James J. Pingor

(57) ABSTRACT

Systems and methods provide for usage based insurance. The insurance system can apply rental insurance based on realtime operational parameters and on a usage history of the renter so that the insurance being applied to the rental period accurately reflects the risks and costs of the device usage. Realtime operational parameters of the device can be obtained from an electronic control unit on the device. The operational parameters can include information about how the vehicle is being operated and whether or not the device is being used in an autonomous or semi-autonomous operating mode. The usage history can include prior operational parameters from previous rental periods, traffic and other regulatory violations, and other relevant information associated with the user. The usage based insurance can apply to the entire rental period, or to portions of the rental period.

11 Claims, 11 Drawing Sheets

SYSTEM AND METHOD FOR USAGE BASED INSURANCE FOR ON-DEMAND RENTAL DEVICE

BACKGROUND

Traditional rental models are typically rigid with respect to the application of insurance fees. Vehicles are rented at a flat rate, charged on a per hour, day or week basis, with correspondingly flat insurance rates. There is no incentive to help the renter who has good driving habits to save money, and thus help the renter to attract the best drivers. Also, the rigid rental insurance model does not allow renters to provide varied schemes that can attract more renters by providing greater flexibility in rental and insurance policies. The advent of autonomous vehicles and vehicles with varying degrees of driver-assist technologies may also have an impact on the driving habits of the renter which are difficult to predict when entering into a rental contract.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate using a usage based insurance for on-demand rentals. The usage based insurance system allows the ability to charge variable insurance fees based on real-time and historical data collection, via either a dedicated electronic device which is connected to a rental device, either directly or via wireless connection, or a mobile phone which is carried in the vicinity of the rental device or the rental device has native support (it does not require either the dedicated electronic device or the mobile device). The system charges fees, or provides discounts, based on the real time actions of the rental device operator.

The rental device can be any type of motorized vehicle, motorcycle, drone, airplane, boat, speciality vehicle, snowmobile, all-terrain vehicle or tool device. In various embodiments herein, the vehicles can have autonomous, or semi-autonomous modes that allow the devices to operate themselves with limited user input or feedback. The usage based insurance system can vary the insurance rates charged based on the level of use of these autonomous or semiautonomous modes. The usage based insurance system can also adjust the insurance rates charged based on the driving and/or operation history of the user renting the device. For example, a user with a sterling safety history who always operates devices within predetermined operational parameters can be charged a lower insurance rate than a user with a sub standard safety history, or one who operates devices outside of the operational parameters (e.g., speeding, tailgating, braking late, etc).

For these considerations, as well as other considerations, in one or more embodiments, a system can include a memory to store computer-executable instructions and a processor, coupled to the memory, to facilitate execution of the computer-executable instructions to perform operations. The operations can include receiving a device usage request from a user account, wherein the device usage request comprises an estimated time usage for a device. The operations can also include receiving device parameter information via a device electronic control unit. The operations can also include receiving usage history information associated with the user account. The operations can also include determining an insurance policy based on a function of the estimated time usage, device parameter information and the usage history information.

In another embodiment, a method for providing dynamic rental insurance can comprise determining, by a system comprising a processor, that a rental period for a rental device has been initiated. The method can also include receiving, by the system, operational parameter information from the rental device via an electronic control unit on the rental device. The method can also include receiving, by the system, usage history information associated with a renter account. The method can also include determining, by the system, an insurance rate based on a function of the operational parameter information and the usage history information.

In another embodiment, a non-transitory computer-readable medium, comprising instructions that when executed by a computer processor perform operations. The operations can include determining that a rental period for a rental device has been initiated. The operations can also include receiving operational parameter information from the rental device via an electronic control unit on the rental device, wherein the operational parameter information comprises information about whether the rental device is autonomously operating. The operations can also include generating a risk analysis score based on the operational parameter information, wherein the risk analysis score is based on a variance from predetermined operational parameters. The operations can also include determining an insurance rate based on the risk analysis score.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
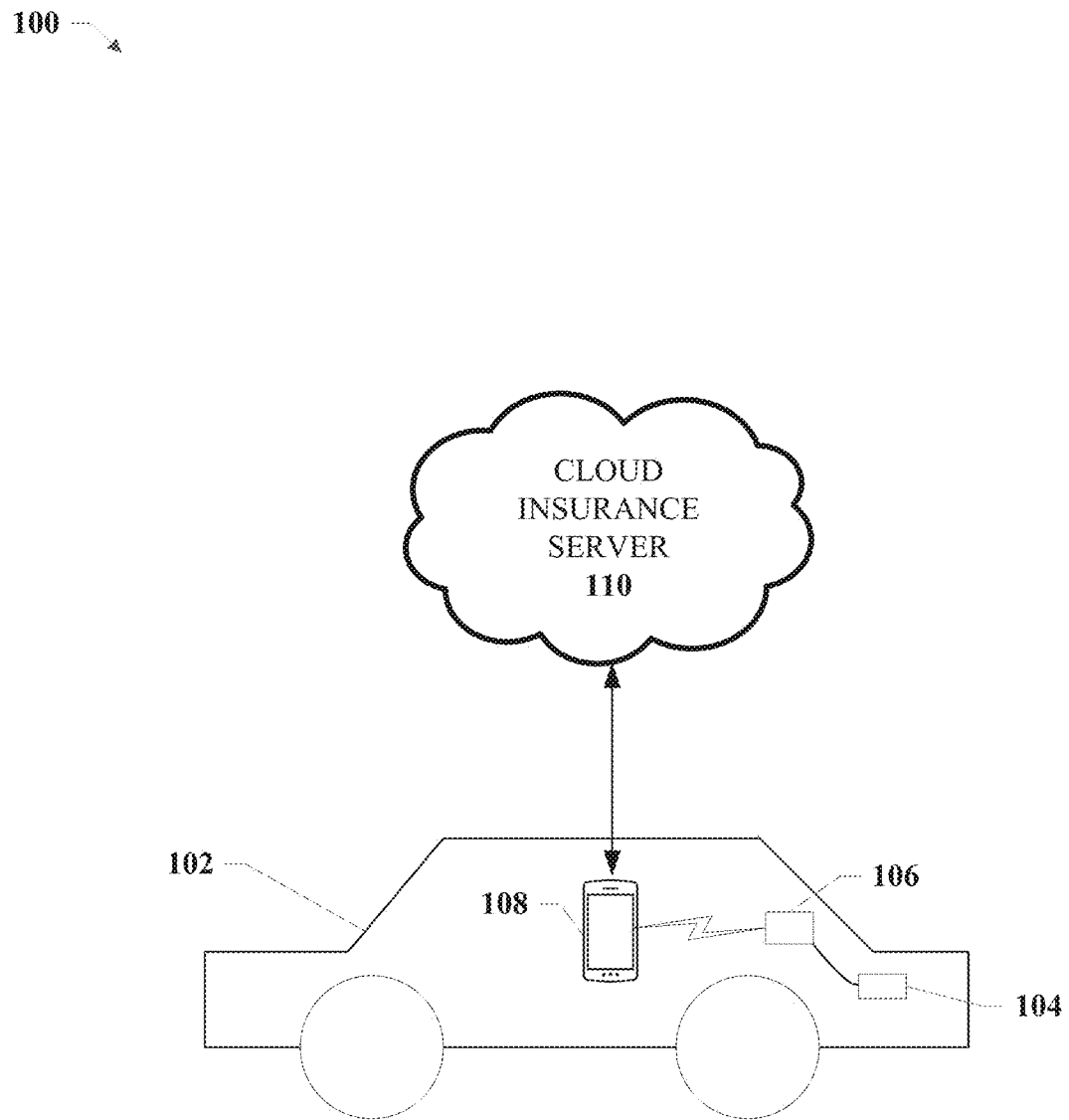
FIG. 1 is an illustration of an example system for applying usage based insurance to a rental vehicle in accordance with one or more aspects of the disclosure.

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wearable device, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In one or more embodiments a usage based insurance is disclosed. The dynamic insurance system can apply rental insurance based on realtime operational parameters and on a usage history of the renter so that the insurance being applied to the rental period accurately reflects the risks and costs of the device usage. Realtime operational parameters of the device can be obtained from an electronic control unit on the device. The operational parameters can be obtained directly from the electronic control unit which uploads them wirelessly to a cloud insurance server. In other embodiments, a bridge device can be communicably coupled to the electronic control unit (e.g., plugged into an on board diagnostics port (OBD-II) on a vehicle). The bridge device can transmit the operational parameters to the cloud directly via a cellular connection or other wireless connection, or can transmit the parameters to a mobile device in the vehicle (e.g., the renter's mobile device), which can forward them to the insurance server. The operational parameters can include information about the speed and acceleration of the vehicle, braking frequency, turning radius, frequency and length of use, mileage, location, and whether or not the device is being used in an autonomous or semi-autonomous operating mode, among other operational parameters.

The usage based insurance can also take into account a usage history associated with the renter of the device. The usage history can include prior operational parameters from previous rental periods, traffic and other regulatory violations, and other relevant information associated with the user. The usage history can be obtained from the mobile device associated with the user, or from account information stored in the cloud. The usage based insurance can apply dynamic rental rates based on the operating parameters as well as the usage history. The usage based insurance can apply to the entire rental period, or to portions of the rental periods. The cumulative insurance rates for the portions can then be combined together for the insurance rate for the overall rental period.

Turning now to FIG. 1, illustrated is an example system 100 for applying usage based insurance to a rental vehicle 102 in accordance with one or more aspects of the disclosure. It is to be appreciated that while FIG. 1 references a motor vehicle 102 as the rental device, in other embodiments, boats, airplanes, drones tools, and any other device capable of being rented that has an electronic control unit that can determine and/or facilitate communication of device operating parameters is possible.

In the embodiment shown in FIG. 1, a vehicle 102 can be rented, and to determine usage based insurance, a cloud insurance server 110 can receive current and/or realtime operational parameters from the vehicle 102 from the electronic control unit 104 on the vehicle. In an embodiment, a bridge device 106 can be communicably coupled (e.g., via the OBD-II port of the vehicle 102) to the electronic control unit 104 and transmit the operational parameters to a mobile device 108 associated with the renter. The mobile device 108 can then transmit the operational parameters to the cloud insurance server 110.

In an embodiment, the bridge device 106 can be communicably coupled to the electronic control unit 104 via a physical port e.g., an OBD-II port or other similar diagnostics port. In other embodiments, the bridge device 106 can be wirelessly coupled to the electronic control unit via Bluetooth, Wi-Fi, or other wireless communications protocols and/or technologies. In an embodiment, the mobile device 108 can receive operational parameters directly from the electronic control unit 104 wirelessly, without a bridge device.

In an embodiment, the bridge device 106 can be a lean device that has minimum computing power (runs a microcontroller)—would run off button-cell type battery. It can do minimum processing and storage in some embodiments and store and forward messaging when communicating with the mobile device 108 or the electronic control unit 104. The bridge device 106 can be deterministic in terms of power consumption, with tiered levels of activity. Instead of polling the mobile device 108, in some embodiments, the microcontroller on the bridge device 106 can wake up at predefined intervals—the predefined intervals is based on the levels of activity, which along with the tier is set by a mobile application on the mobile device 108, thus the mobile app will have the ability to calculate quite accurately when the battery is going to run low.

In an embodiment, the operational parameters can include speed and acceleration of the vehicle 102, braking frequency, turning radius, frequency and length of use, mileage, location, and whether or not the vehicle 102 is being used in an autonomous or semi-autonomous operating mode, among other operational parameters. In embodiments where the rental device is different than a vehicle, the operational parameters can be whatever is relevant information that is tracked by the electronic control unit 104. For instance, the operational parameters for a drone can include altitude of operation, g-forces, operating within VLOS (Visual Line of Sight), flying within the regulated distance within the ATZ (Aerodrome Traffic Zone) etc., and for a boat the operational parameters can be tonnage, and etc. Other operational parameters are possible for other types of rental devices The cloud insurance server 110 can apply an insurance rate to the user associated with the rental based on the operational parameters. This provides an incentive for the renter to operate the vehicle 102 in a safe manner. Drivers that drive slower therefore can be rewarded with lower insurance rates that reflect the lower risk inherent in driving slower. Similarly, drivers that drive with more autonomous driving features enabled can also receive lower insurance rates. A driver who prefers to use more of a vehicle's autonomous driving capability can be differentiated from a driver who prefers to handle the driving themselves (and thus rely less on the vehicle's capability). It is widely accepted that driver who relies more on vehicle capabilities such as driver-assisted lane changing or autonomous driving are safe drivers and should be preferred by giving them economic incentives. Similarly, for drones, airplanes (and unmanned aerial vehicles) and boats that have geo-fencing features enabled and not over-ridden in operation can also receive lower insurance rates.

In an embodiment, the cloud insurance server 110 can apply an insurance rate at an end of a rental period based on the usage of the vehicle 102 during the rental period. In other embodiments, the cloud insurance server 110 can apply a set of insurance rates to predetermined time periods during the rental period (e.g., every 1 minute, 5 minutes, etc.) At the end of the rental period, the rates for the various periods can be combined to determine the overall rate.

In an embodiment, the cloud insurance server 110 can also consider the location of the vehicle 102 in combination with the current operations parameters to determine how safely the vehicle is being driven. The location can be provided to the cloud insurance server 110 via location information provided by the mobile device 108 or by the bridge device 106 or by the electronic control unit 104. Using the location, the cloud insurance server 110 can determine the speed limit and other contextual information to determine how safely the car is being driven based on the operating parameters. For instance, if the speed of the vehicle is determined to be 45 miles per hour, but the cloud insurance server 110 determines that the speed limit at the location of the vehicle 102 is 35 miles per hour, then the deviation from the speed limit is +10 miles per hour or the cloud insurance server determines that it was school hours at the location of the vehicle 102 thus the deviation from the speed limit is +25 miles per hour.

In an embodiment, the cloud insurance server 110 can also take into account the usage history, or driving profile, of the renter when determining the insurance rate. The cloud insurance server 110 can access driving records, previous rental agreements and insurance rates charged, previous usage parameters during previous rental periods, and etc. and provide a baseline insurance rate. The baseline insurance rate can then be adjusted in realtime based on the current operational parameters of the vehicle.

In an embodiment, the cloud insurance server 110 can provide a digital contract to the mobile device 108 which can display the contract. In response to the user accepting the contract via the mobile device 108, the contract can go into effect. The digital contract can be based on information that is collected by the cloud insurance server 110 and can include rules such as if the vehicle speed exceeds the speed limit (or limit set by the rental agency), the base insurance charge gets added $3 or other predetermined amount for every minute or fraction thereof. Other rules can include predetermined charges for each stunt performed (in the case of snowmobiles, boats, cars, etc). Taking boats into restricted regions (shallow waters, shoals, busy ports, etc) can cause predetermined charges, one off charges, or per time period charges. The insurance service also includes an editor to create the digital contracts. In one embodiment, the digital contract is akin to a Smart Contract and hence it is tamper resistant. In another embodiment, the contract will have the signor's digital signature and also have non-repudiation feature such as customer cannot deny he or she was not aware of the rules in the contract. Insurance services will use the data collected to readjust the base rental fee and the data will also be used along with other drivers in the same region and/or age group and/or type of vehicle. The data will also be used to prepare and provide further actuarial services. In an embodiment, the driving data (based on the operating parameters) can be stored, so that that the driver can use it in the future to demonstrate driving skills. In an embodiment, the digital contract can be stored in a block-chain in order to protect the integrity of the digital contract.

In an embodiment, A typical Digital Contract includes rate information as defined by the Rental company, driving particulars that are monitored and the rates charge associated with them. The digital contract may also include rules and regulations and depending upon the jurisdiction, rules and regulation will express what constitutes safe driving, given the varying types of autonomous vehicles and UAV. The digital contract may also include liability limits and limits as established by the driver, manufacturer, and rental company to address liability issues. The digital contract may also include underwriting terms and underwriting criteria which include access to the driver's driving incidents, make & model of the vehicle, access to these bridge devices, and repair costs where as the complexity of parts increases, the modalities of sharing the repair cost is likely to be made precise. The digital contract can be stored securely and can be self-executing.

In an embodiment, the digital contract can enable lease-on-demand arrangements where fractionated usage of a rental device with a short lease duration is possible. The digital contract can also take into consideration legislation that governs relevant aspects of the rental market and rules and regulations regarding operation of rental devices. One area with a lot of rules and regulations is airborne transportation and flying. There can be temporary restrictions imposed on flying regions that can impact pilots and unmanned aerial vehicle (UAV) operators. The operator on the ground has to fly the UAV in a safe manner that is compliant with FAA regulations.

The baseline insurance rate can also be based upon the make and model of the vehicle 102, the liability limits as established by the driver, manufacturer, and rental company to address liability issues, underwriting criteria include access to driver's driving incidents, and access to these bridge devices, and estimated repair and maintenance costs based on the location, driving history, and etc.

In an embodiment, the cloud insurance server 110 can take into consideration local customs and rules and regulations when determining safe driving practices. Depending upon the jurisdiction, rules and regulation will express what constitutes safe driving, given the varying types of autonomous vehicles or driver driven vehicle or pilot flown drone and so on.

Figure 2:
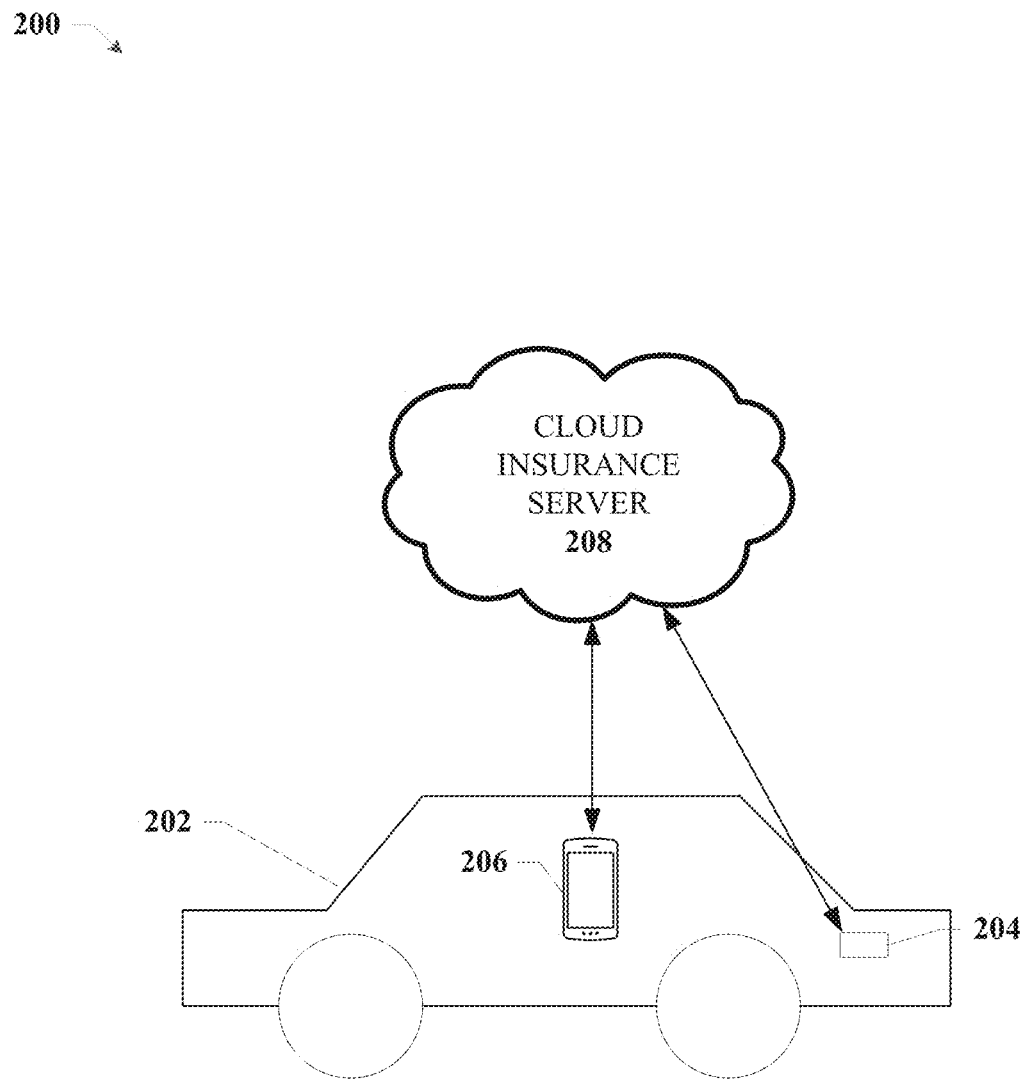
FIG. 2 is an illustration of an example system for applying usage based insurance to a rental vehicle in accordance with one or more aspects of the disclosure.

Turning now to FIG. 2, illustrated is an example system 200 for applying usage based insurance to a rental vehicle in accordance with one or more aspects of the disclosure.

In the embodiment shown in FIG. 2, a vehicle 202 can be rented, and to determine usage based insurance, a cloud insurance server 208 can receive current and/or realtime operational parameters from the vehicle 202 from an electronic control unit 204 on the vehicle. In an embodiment, the electronic control unit 204 can wireless transmit (e.g., via cellular connection) the operational parameters to the cloud insurance server 208. The cloud insurance server 208 can transmit the contract information or insurance rate to a mobile device 206 associated with the renter/operator of the vehicle 202.

In an embodiment, the operational parameters transmitted by the ECU 204 to the cloud insurance server 208 can include information related to how the vehicle is being operated, and whether the vehicle is being operated within predetermined operational parameters established by the rental agency. The data can include time since engine start which shows the time the engine has been running since it was last started. This can indicate whether the driver has the tendency to leave the vehicle idle for extended period of time. The data can also include vehicle speed as read by the vehicle speed sensor. Using the location, provided either by the mobile device 206 or the ECU 204, the speed limits can be determined and a speed limit variance can be determined. The data can also include the absolute pedal position pedal position.

The data can also include the length of time that the driver has driven with the check engine light activated or the fuel light activated. Each of these driving behavior can cause increased risk or costs, and so it would be appropriate to track this information when applying insurance rates or fees to the rental.

In an embodiment, the mobile device 206 can be paired with the vehicles 202's ECU 204 using one of a variety of wireless technologies/protocols. This can be performed when the user approaches the vehicle 202 or enters the vehicle 202 or otherwise initiates, via the mobile device, a request to rent the vehicle 202. Once the ECU 204 and the mobile device 206 are connected, the user can be asked for an estimated time that they wish to use the vehicle for. This data, in conjunction with the customer's prior records, accessible by the cloud insurance server 208 and/or the mobile device 206, risk scores, data for the specific vehicle type, (type, make, size, etc.) triggers a risk analysis engine in the cloud server 208 to generate an estimated insurance rate.

The estimated insurance rate can be presented as a range of possible insurance rates, or can be a fee, or discount to a fee, based on the operation of the vehicle. The customer can select one or more of the insurance options, and the option can be recorded on the mobile device 206 as well as the cloud insurance server 208 and back to the rental agency and insurance company via respective APIs. In an embodiment, there can be a recommended insurance option from a range of insurance options based on the predicted usage pattern of the driver.

As the vehicle is operated during the rental period, and operating parameters of the vehicle are sent to the cloud insurance server 208 via the ECU 204, the cloud insurance server 208 can update the insurance fees or estimated insurance costs. The updated insurance can be communicated to the mobile device 206 to give the customer feedback on driving performance, and provide an incentive to operate the vehicle in a safer manner.

In an embodiment, the mobile device 206 can communicably couple to the ECU 204 and receive the operational parameters from the vehicle 202 directly. An application on the mobile device 206 can log the operational parameters and perform the risk analysis operations locally on the mobile device 206. The mobile device 206 can store a usage history associated with the user locally, or access it from the cloud insurance server 208.

Figure 3:
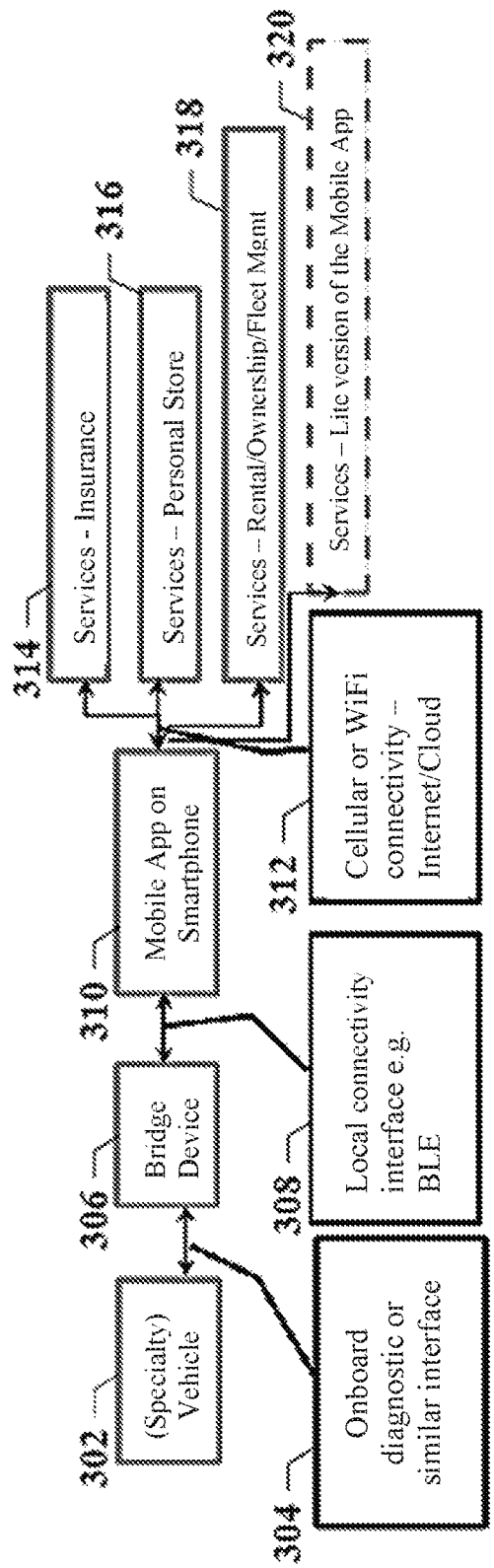
FIG. 3 is an illustration of an example flowchart that shows a method for applying usage based insurance in accordance with one or more aspects of the disclosure.

Turning now to FIG. 3, illustrated is an example flowchart 300 that shows a method for applying usage based insurance in accordance with one or more aspects of the disclosure. A vehicle 302 or some other device, such as an airplane, unmanned aerial vehicle, boat, motorcycle, motorized tool, or any device that has an electronic control unit that can track and log diagnostic information and other operational parameters associated with use of the device. The vehicle 302 can be a rental unit that is rentable for predetermined periods of time or for undefined periods of time at one or more rates. The vehicle 302 can also be a vehicle used in a fractional ownership plan where several parties may own shares in a vehicle or tool. The vehicle 302 can also be part of a shared car service where users can pay monthly or annual memberships and enjoy the use of the vehicle 302 for rates billable by the hour or day. Applying a usage based insurance model to these fractional ownership and car share vehicles can be an equitable way of splitting the risk between the users based on their relative likelihood to cause harm to the vehicle.

A bridge device 306 can be communicably coupled to the vehicle 302 via a onboard diagnostic interface 304. In some embodiments, the onboard diagnostic interface 304 can be an OBD-II type port that allows wired connection to the bridge device. In other embodiments, the interface 304 can be a wireless interface that allows the bridge device to wirelessly connect to the electronic control unit on the vehicle 302. In yet another embodiment, the bridge device 306 might be integrated into the vehicle 302

The bridge device 306 can be a lean device that has minimum computing power (runs a microcontroller)—would run off button-cell type battery. It can do minimum processing and storage in some embodiments and store and forward messaging when communicating with the mobile aoo 310 on a mobile device. The bridge device 306 can be deterministic in terms of power consumption, with tiered levels of activity. The microcontroller on the bridge device 306 can wake up at predefined intervals—the predefined intervals is based on the levels of activity, which along with the tier is set by a mobile application 310 on the mobile device, thus the mobile app 310 will have the ability to calculate quite accurately when the battery is going to run low. The bridge device 306 can connect to the mobile app 310 via a local connectivity interface 308 such as Wi-Fi, Bluetooth, a near field communication interface, or any other wireless interface known to a person having ordinary skill in the art. In other embodiment, when the bridge device 306 is integrated into the vehicle 302, the mobile application 310 on the mobile device will connect to the Vehicle 302 over a wireless technology such as Cellular Network or Wi-Fi Network with a cloud server as the intermediary between the vehicle 302 and the mobile application 310.

The mobile app 310 on the smartphone can include an interface that allows the user to enter an estimated time usage or initiate a request to rent the vehicle 302. The mobile app 310 can transmit the information to a cloud server via an cellular or Wi-Fi connection 312. The cloud server can generate an estimated or baseline insurance rate based on a risk analysis of the user's usage history, location, time of rental, etc. The estimated or baseline rate can then be transmitted back to the mobile app 310 which can display the estimated rate on the interface. The interface can then be used to facilitate insurance services 314, personal store services 316, and rental services 318 via either the mobile app 310 or a lite version of the mobile app 320.

In an embodiment, the mobile app 310 can also enable communications with the operator of the vehicle through various means including text or graphical notifications. It also enables the customer to review and approve insurance fees and discounts which would be available to the driver and the ability to clock in and clock out via entry of login passwords via an administrator. There can also be a dashboard that allows the operator to view in real-time the fees or discounts as they are applied to the operator or with the vitals appropriate for the vehicle/location/contract.

In an embodiment, the insurance services 314 can include providing baseline and estimated insurance rates based on the usage of the vehicle 302 and a usage history of the user. In other embodiments, the estimated insurance can be updated based on the changing driving habits of the user. The insurance services 314 can also include incentives and information about how to lower the insurance rates by defining operating modes and behaviors. For instance, the mobile app 310 can display information informing the user that if they drive 5 mph slower, the insurance rate will be lowered by a specific amount, and provide total dollar awards or incentives for better driving.

The insurance service 314 also includes an editor to create the digital contracts. The benefit of digital contract is tamper resistant. The contract will be have the signor's digital signature and also have non-repudiation feature such as customer cannot deny he or she was not aware of the rules in the contract. Insurance services 314 will use the data collected to readjust the base rental fee and the data will also be used along with other drivers in the same region and/or age group and/or type of vehicle. The data will also be used to prepare and provide further actuarial services Personal store services 316 can include storing information relating to the operation of the vehicle 302 for future use and for analyzing the driving habits and behavior of the user. This goes beyond the traditional DMV and/or insurance information at a macro level which is limited to accidents and claims. The Renter/Owner/Fleet Management services 318 can facilitate keeping track of maintenance issues about the vehicle and flag them to the appropriate responders.

A lite version 320 can be provided specifically for the rental or fleet management companies to install a phone directly in the vehicle—then the version of the mobile App on the driver's smartphone will be the lite version. In an embodiment, the mobile app 310 can have an interface that allows the driver or user to earn badges and other virtual (or real) rewards against their driving or operational records. The user can compare their records to friends via a social network connection. This will require the capture and sharing of data via the social network.

Operational parameters received from the bridge device 306 can also be shared with the DMV or other agencies and be provided for a fee based upon one or more operating agreements. The operational parameters can also be streamed to social media services and other public sources for the user's social circle to review The operational parameters can also be reviewed by parents and other family members who wish to ensure that the operator will operate vehicle safely (especially for fractional ownership and shared vehicle schemes). Serious infractions can be immediately directed by the system direct to local law enforcement, along with exact location of the device.

Figure 4A:
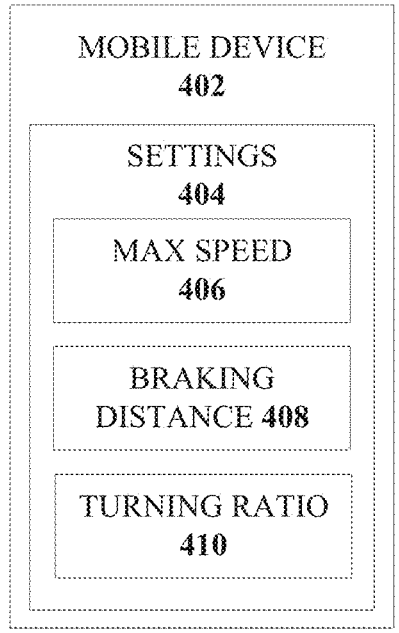
FIGS. 4A, 4B, and 4C is an illustration of several exemplary embodiments of a mobile device interface for a usage based insurance system in accordance with one or more aspects of the disclosure.
Figure 4B:
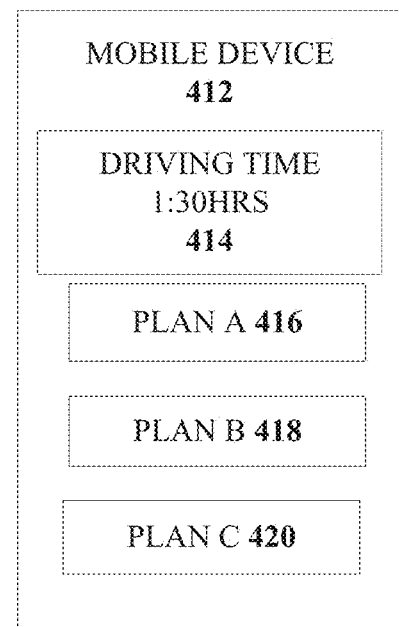
Figure 4C:
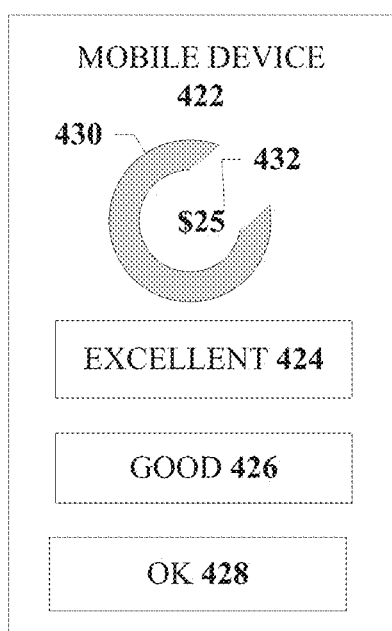

Turning now to FIGS. 4A, 4B, and 4C, illustrated are several exemplary embodiments of a mobile device interface for a usage based insurance system in accordance with one or more aspects of the disclosure.

In the embodiment shown in FIG. 4A, the mobile device 402 can display a screen with various settings 404. The Settings 404 can be predetermined operational parameters that are set as limits by the rental agency or by mutual agreement with the renter. Insurance rates can be based on the operational parameters not exceeding the settings as set forth in 404. The settings can include max speed 406, braking distance 408 and turning ratio 410. Max speed 406 can also be speed above the speed limit in some embodiments. If any of these predetermined settings are exceeded during operation of the vehicle or device, then the insurance rate can be adjusted by a predetermined amount, based on the variance.

In FIG. 4B, mobile device 412 can show an estimated driving time or time of usage of the device 414, and then show a list of driving plans 416, 418, and 420. When renting the vehicle, the user can either provide the estimated driving time 414 of 1 hr and 30 minutes, or provide a destination, and the system can use one or more mapping services to calculate a driving time. The system can then generate one or more insurance plans, Plan A 416, Plan B 418, or Plan C 420 based on the destination and/or driving time 414 as well as the other pertinent information such as driving history, past rental experiences and risk model information generated by a risk analysis engine. The user can then select which one of the plans (after being presented with detailed information about each plan).

Figure 5:
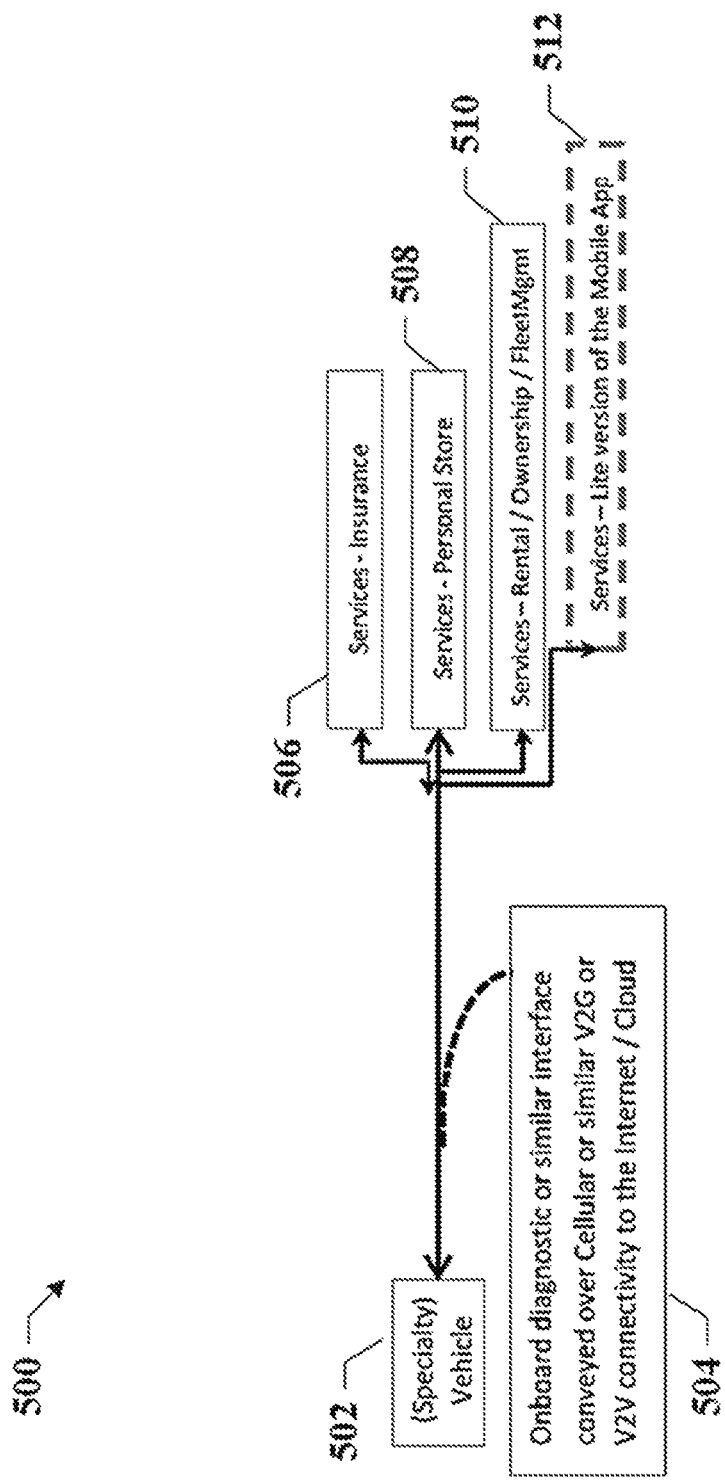
FIG. 5 is an illustration of an example flowchart that shows a method for applying usage based insurance in accordance with one or more aspects of the disclosure.

In FIG. 4C, the mobile device 422 can display a customer dashboard that shows performance of the vehicle during the rental period. The dashboard can include a graphical representation 430 showing how close the user is to achieving a goal or charge milestone 432. Performance indicators 424, 426, and 428 can show whether the performance is excellent, good, or ok. These can be a stream of events which triggered an effect to the amounts described above. If the operator maintains a positive state of operation over time, they can earn credits against what they already paid. In certain other embodiments, the terminal on the vehicle 302 itself may have the dashboard thus not requiring the mobile device 422 or it can be combination of both—the terminal in the vehicle as well as the mobile app on the smart phone Turning now to FIG. 5, illustrated is an example flowchart 500 that shows a method for applying usage based insurance in accordance with one or more aspects of the disclosure.

A vehicle 502 or some other device, such as an airplane, unmanned aerial vehicle, boat, motorcycle, motorized tool, or any device that has an electronic control unit that can track and log diagnostic information and other operational parameters associated with use of the device. The vehicle 502 can be a rental unit that is rentable for predetermined periods of time or for undefined periods of time at one or more rates. The vehicle 502 can also be a vehicle used in a fractional ownership plan where several parties may own shares in a vehicle or tool. The vehicle 502 can also be part of a shared car service where users can pay monthly or annual memberships and enjoy the use of the vehicle 502 for rates billable by the hour or day. Applying a usage based insurance model to these fractional ownership and car share vehicles can be an equitable way of splitting the risk between the users based on their relative likelihood to cause harm to the vehicle.

The ECU unit of the vehicle 502 can transmit the onboard diagnostic information over a cellular or similar vehicle to grid (V2G) or vehicle to vehicle (V2V) connectivity to the cloud server at 504. The driver can then download an app into their phone to get the dashboard. The Dashboard includes graphical representation such as how close the operator is to the new savings/charge milestone, current milestone hit/amount of savings and various other information that the driver/operator must be aware of. In certain other embodiments, the terminal on the vehicle itself may have the dashboard thus not requiring the smartphone or it can be combination of both—the terminal in the vehicle as well as the mobile app on the smart phone. This dashboard and information can enable insurance services 506, personal store services 508, and rental/ownership/fleet management services 510 or the lite mobile app version 512 as described above with regard to FIG. 3.

Figure 6:
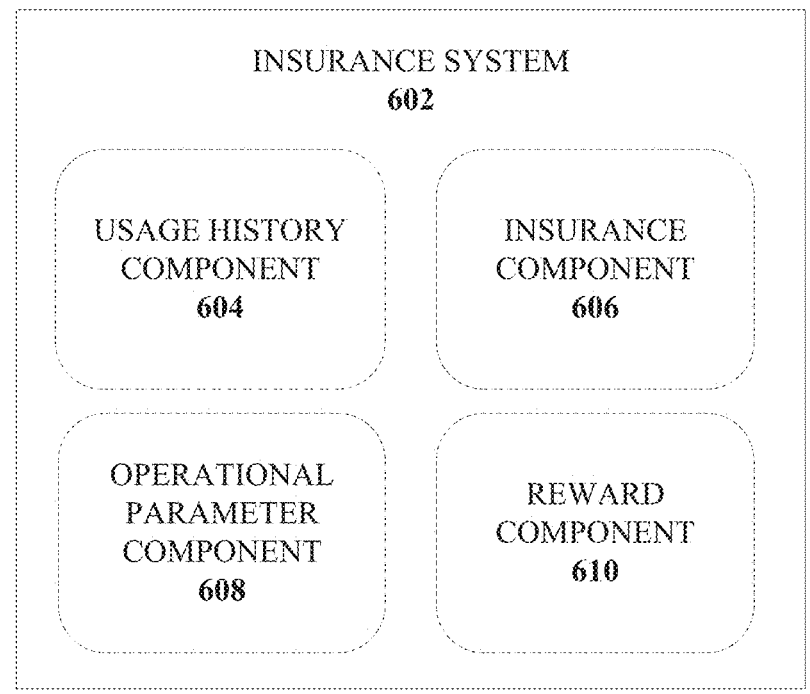
FIG. 6 is an illustration of an example usage based insurance system in accordance with one or more aspects of the disclosure.

Turning now to FIG. 6, illustrated is an example usage based insurance system 600 in accordance with one or more aspects of the disclosure. An insurance system 602 can be either in a cloud server (e.g., cloud insurance server 110) in FIG. 1, or on a mobile device belonging to the customer or the rental agency. The mobile device belonging to the customer can have a mobile application that can include the insurance system 602 and can facilitate renting vehicles, while the mobile device belonging to the rental agency can be placed in the vehicles and provide a means for the customer to interact with the rental agency and facilitate rental and operation of the vehicle.

The insurance system 602 can include a usage history component 604 that can receive a rental usage history of the customer from the customer's mobile device or cloud server, and using the usage history, the insurance component 606 can generate a baseline or estimated insurance rate for the rental period. The usage history component 604 can access driving records, previous rental agreements and insurance rates charged, previous usage parameters during previous rental periods, and etc. and the insurance component 606 can provide a baseline insurance rate. The baseline insurance rate can be based on a risk analysis of the driver's past behavior to determine the likelihood of harm or negative effects occurring as well as an analysis of the likely cost of the negative effects.

An operational parameter component 608 can receive operational parameters from the electronic control unit on the vehicle or rental device, where operational parameters can include speed and acceleration of the vehicle, braking frequency, turning radius, frequency and length of use, mileage, location, and whether or not the vehicle is being used in an autonomous or semi-autonomous operating mode, among other operational parameters. In embodiments where the rental device is different than a vehicle, the operational parameters can be whatever is relevant information that is tracked by the electronic control unit. For instance, the operational parameters for an airplane can include altitude, g-forces, etc., and for a boat the operational parameters can be tonnage, and etc. Other operational parameters are possible for other types of rental devices.

Figure 7:
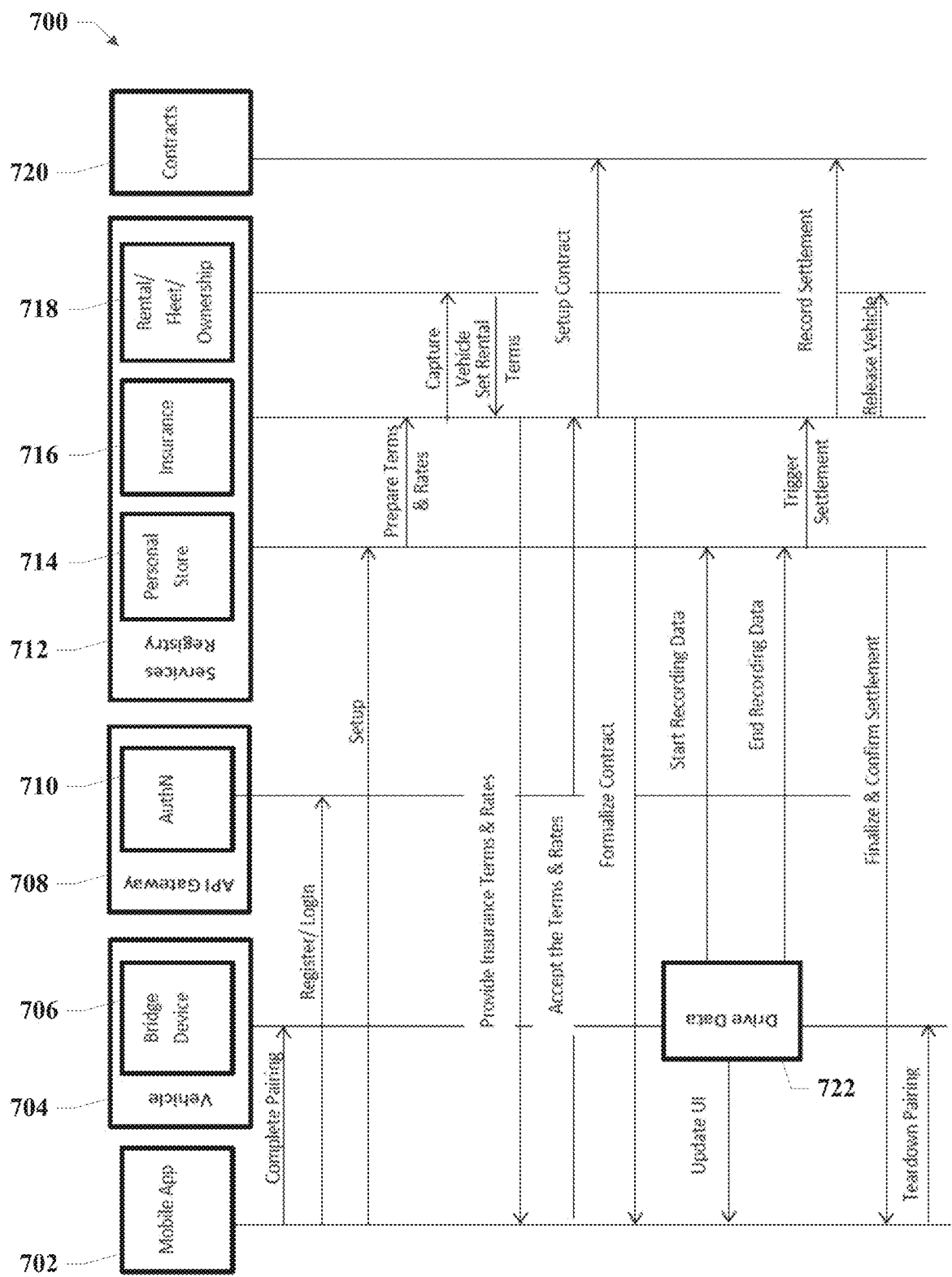
FIG. 7 is an illustration of an example flow chart of a method for on demand renting of a vehicle according to one or more embodiments.
Figure 8:
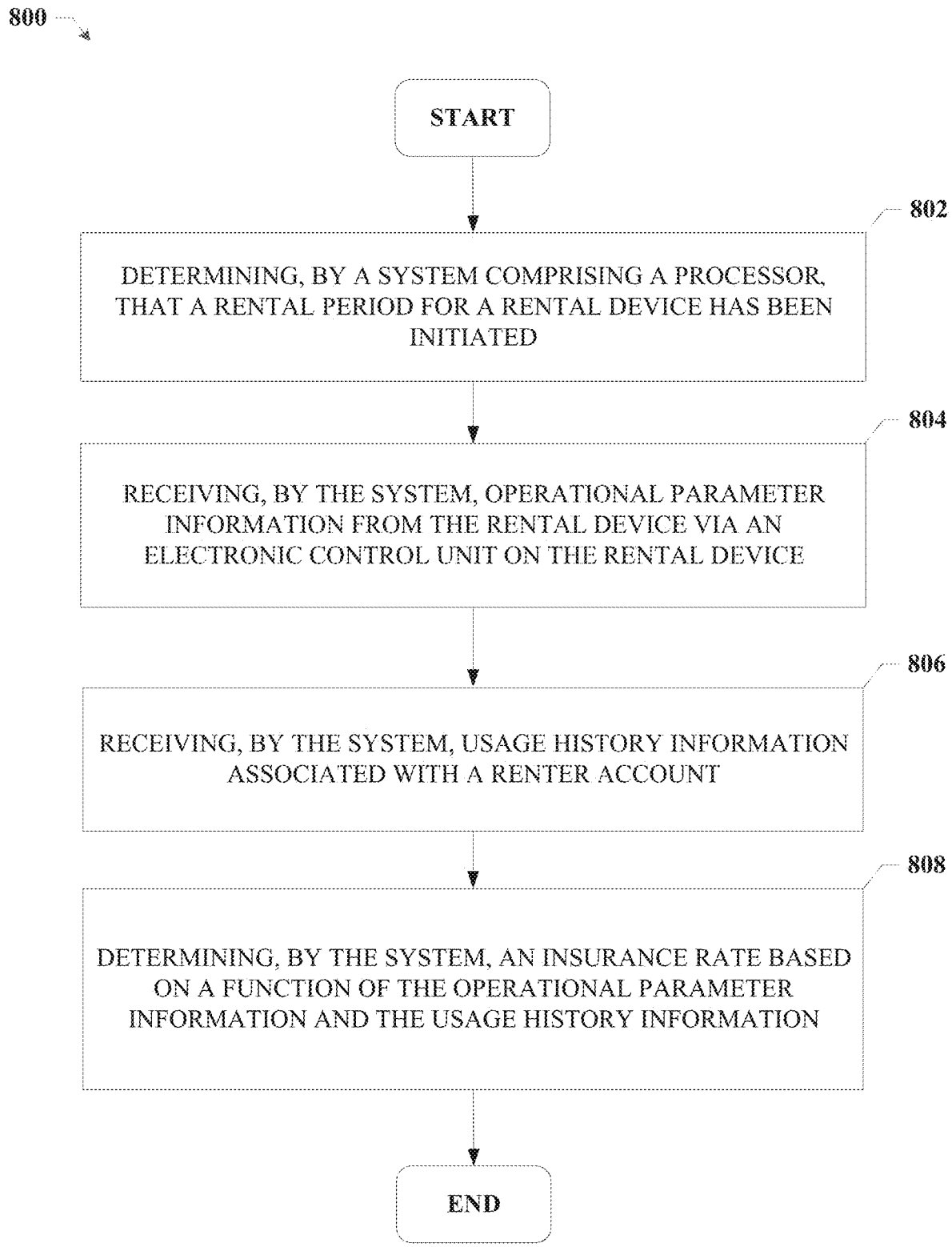
FIG. 8 is an illustration of an example flow chart of a method for facilitating usage based insurance according to one or more embodiments.
Figure 9:
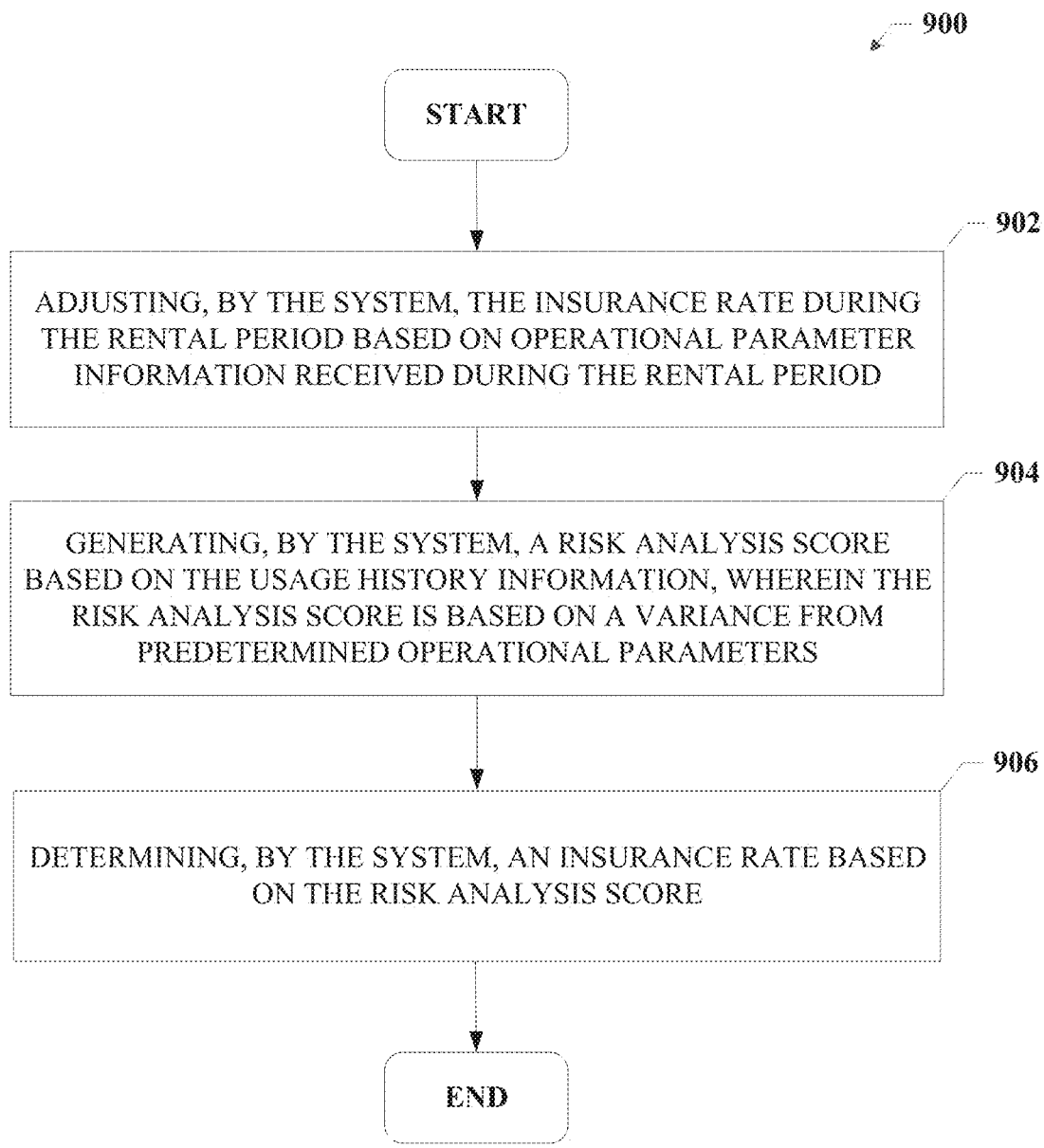
FIG. 9 is an illustration of an example flow chart of a method for facilitating usage based insurance according to one or more embodiments.

The insurance component 606 can use the operational parameters to adjust the estimated insurance rate based on the current driving behavior of the renter. The reward component 610 can then provide incentives to the user to adjust their driving behavior in order to achieve lower insurance rates. Drivers that drive slower therefore can be rewarded with lower insurance rates that reflect the lower risk inherent in driving slower. Similarly, drivers that drive with more autonomous driving features enabled can also receive lower insurance rates. A driver who prefers to use more of a vehicle's autonomous driving capability can be differentiated from a driver who prefers to handle the driving themselves (and thus rely less on the vehicle's capability). It is widely accepted that driver who relies more on vehicle capabilities such as driver-assisted lane changing or autonomous driving are safe drivers and should be preferred by giving them economic incentives. Similarly, for airplanes (and unmanned aerial vehicles) and boats that have autopilot features enabled can also receive lower insurance rates. The insurance component can use the digital contracts to use the operational parameters FIGS. 7-9 illustrates processes in connection with the aforementioned systems. The process in FIGS. 7-9 can be implemented for example by systems 100, 200, 210, 300, 400, 500, and 600, illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 is an illustration of an example flow chart of a method for on demand renting of a vehicle according to one or more embodiments. A mobile app 702 on a mobile device belonging to a potential customer and/or renter, can complete pairing with a bridge device 706 on a vehicle 704. The pairing can be completed using one of a variety of wireless technology protocols including Bluetooth, Wi-Fi, NFC and/or other technologies. Simultaneously and/or subsequently, the mobile app 702 can also be used to register with a rental agency or login to a renter account via an API gateway 708 in order to authenticate 710 the user. Once authenticated at 710, the mobile app 702 can be used to setup the rental with services registry 712. The services registry 712 can perform a variety of functions including storing account information and past performance in a personal store 714, provide insurance at 716, and manage rental/fleet/ownership issues at 718.

After being setup using the account information and usage history stored in the personal store 714, rental terms and baseline insurance rates can be setup by the insurance 716. To facilitate setting up the rates, the rental/fleet/ownership services 718 can be polled and vehicle rates can be captured and rental terms set. The registry services 712 can then provide the insurance terms and rates to the mobile app 702 via the API gateway 708. Via the mobile app 702, and the API gateway 708, the user can accept the terms and rates and transmit the acceptance to the insurance service 716. Once the terms have been accepted, the insurance service 716 can setup the contract at 720, and then formalize the contract by sending it back to the mobile app 702 for acceptance.

The bridge device 706 can start collecting drive data at 722, and the drive data can be sent to the mobile app 702 to update the user interface, but also can be sent to the personal store 714 to record the data. Once the data recording has ended and has been collected by the personal store 714, the insurance service 716 can trigger a settlement based on the operational parameters. The rental/fleet/ownership service 718 can release the vehicle, and the insurance service 716 can transmit the finalized contract and settlement details to the mobile app 702. After settlement has been performed, the mobile app 702 and the bridge device 706 can unpair from each other.

Turning now to FIG. 8, illustrated is an example flow chart 800 of a method for facilitating usage based insurance according to one or more embodiments.

The method can start at 802, where the method includes determining, by a system comprising a processor, that a rental period for a rental device has been initiated.

The method can continue at 804, where the method includes receiving, by the system, operational parameter information from the rental device via an electronic control unit on the rental device.

The method can continue at 806 where the method includes receiving, by the system, usage history information associated with a renter account. The method can continue at 808 where the method includes determining, by the system, an insurance rate based on a function of the operational parameter information and the usage history information.

Turning now to FIG. 9, illustrated is an example flow chart 900 of a method for facilitating usage based insurance according to one or more embodiments.

Method 900 can start at 902 where the method includes adjusting, by the system, the insurance rate during the rental period based on operational parameter information received during the rental period.

The method can continue at 904 where the method includes generating, by the system, a risk analysis score based on the usage history information, wherein the risk analysis score is based on a variance from predetermined operational parameters.

The method can continue at 906, where the method includes determining, by the system, an insurance rate based on the risk analysis score.

Figure 10:
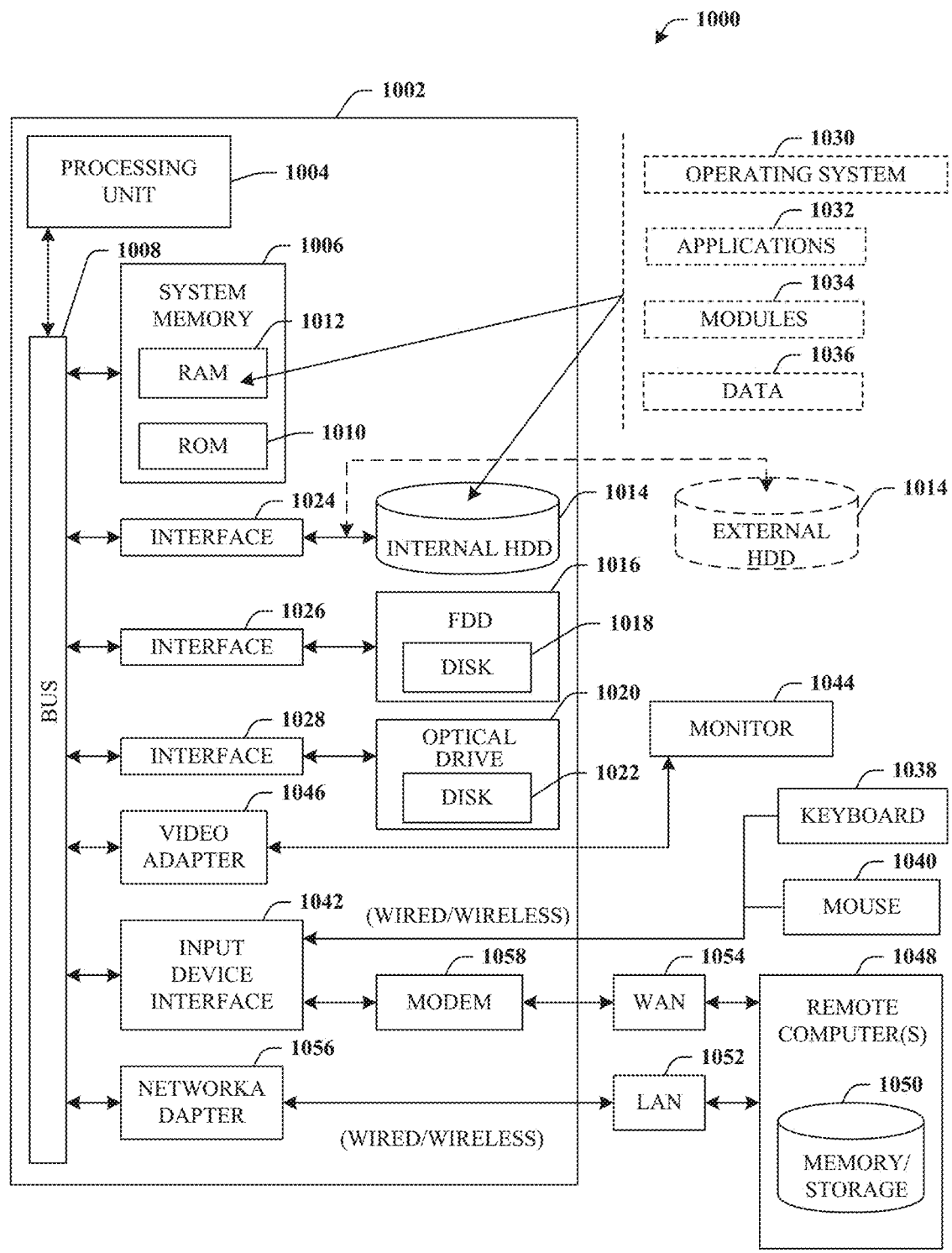
FIG. 10 is an illustration of an example computing environment where one or more of the provisions set forth herein are implemented, according to one or more embodiments.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules or components depicted relative to the computer 1002, or portions thereof, can be stored in the remote memory/storage device 1050. The network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 11:
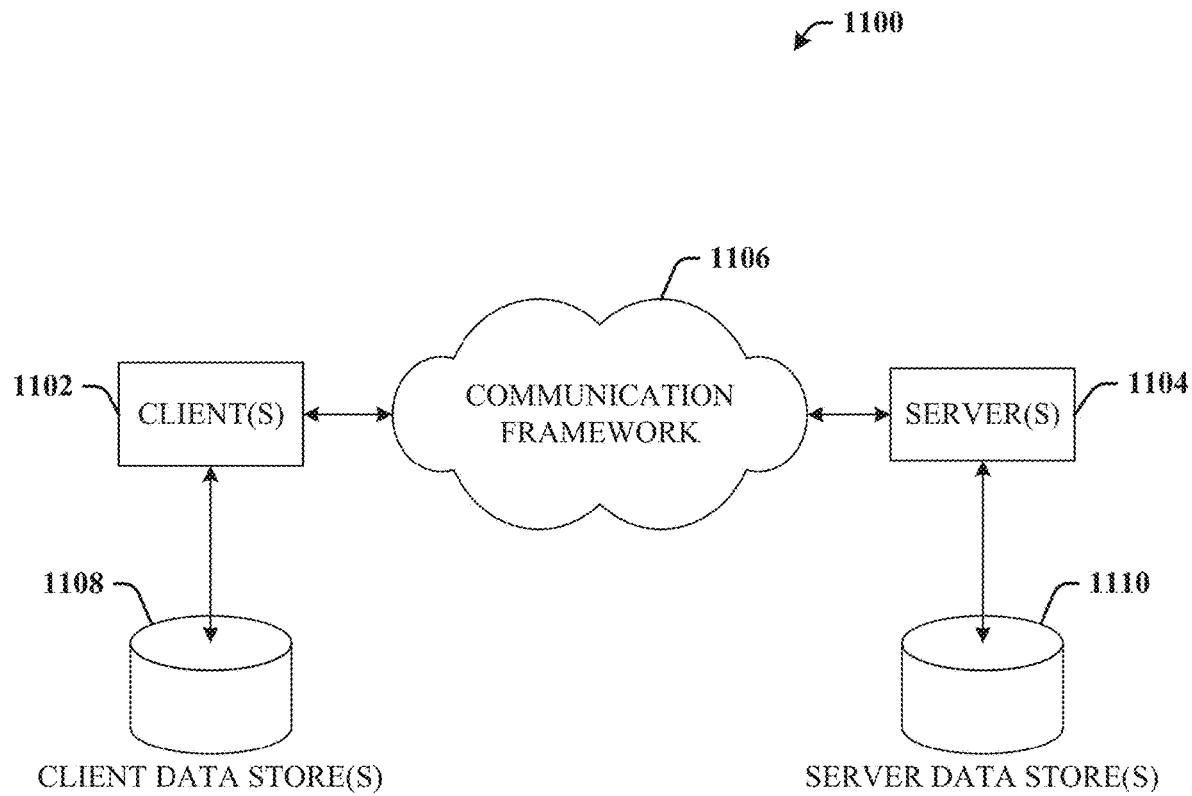
FIG. 11 is an illustration of an example computing environment where one or more of the provisions set forth herein are implemented, according to one or more embodiments.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices).

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102. Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
    a memory configured to store computer-executable instructions; and
    a processor, communicatively coupled to the memory, configured to execute the computer-executable instructions to perform operations, the operations comprising:
        receiving a device usage request via a user interface, wherein the device usage request comprises an estimated time usage for a rental device;
        receiving, in real-time, device parameter information via a device electronic control unit connected to the rental device, including information regarding real-time actions of an operator of the rental device;
        receiving usage history information associated with a user account;
        generating a risk analysis score based on the usage history information;
        determining an insurance policy for the rental device based on a function of the estimated time usage, real-time device parameter information and the risk analysis score, wherein the insurance policy includes a base rental fee and at least one rule for maintaining the base rental fee;
        displaying, by the user interface, the insurance policy;
        receiving, by the user interface, confirmation of acceptance of the insurance policy;
        increasing the base rental fee associated with the insurance policy or providing a discount on the base rental fee based on the real-time actions of the operator of the rental device and adherence to the at least one rule; and
        displaying by the user interface, a visual graphical representation of real-time progress made by the operator toward a goal or milestone to be applied as a reduction to the base rental fee in response to at least the real-time actions of the operator of the rental device and the adherence to the at least one rule.

2. The system of claim 1, wherein the receiving the device parameter information comprises receiving the device parameter information from a bridge device communicably coupled to a diagnostics port of the electronic control unit.

3. The system of claim 1, wherein the receiving the device parameter information comprises receiving the device parameter information wirelessly from the electronic control unit.

4. The system of claim 1, further comprising:
    updating the usage history information based on the device parameter information received during rental device usage.

5. The system of claim 1, wherein the electronic control unit is connected to the rental device wirelessly.

6. The system of claim 1, wherein the risk analysis score is further based on variance from operational parameters established by a rental agency associated with the rental device.

7. The system of claim 1, wherein the usage history information comprises a traffic violation history, speeding history, mileage history, and autonomous operation history.

8. The system of claim 1, wherein the device parameter information comprises information about whether the rental device is autonomously operating.

9. The system of claim 1, wherein the usage history information is based on previous device parameter information from a previous rental.

10. The system of claim 1, wherein the operations further comprise:
    updating the insurance policy in response to the device parameter information satisfying a predetermined condition relating to operation of the rental device.

11. The system of claim 1, wherein the operations further comprise:
    determining the insurance policy based on a digital contract associated with the usage of the rental device, wherein the digital contract utilizes information based on usage history information determined from the device parameter information.

* * * * *